Oct. 7, 1969  R. S. CHILDS ET AL  3,471,192

APPARATUS FOR TRANSPLANTING TREES

Filed Dec. 8, 1967  2 Sheets-Sheet 1

INVENTORS
ROBERT S. CHILDS
EARL L. LOYSTER
BY Joseph G. Werner
ATTORNEY

Oct. 7, 1969       R. S. CHILDS ET AL       3,471,192
APPARATUS FOR TRANSPLANTING TREES
Filed Dec. 8, 1967                         2 Sheets-Sheet 2
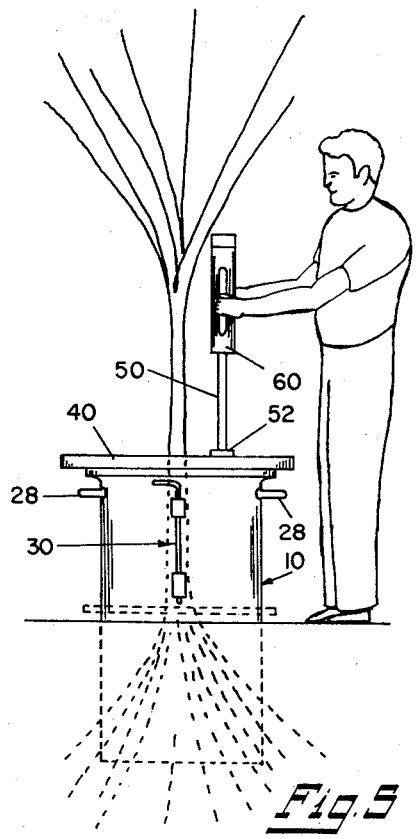
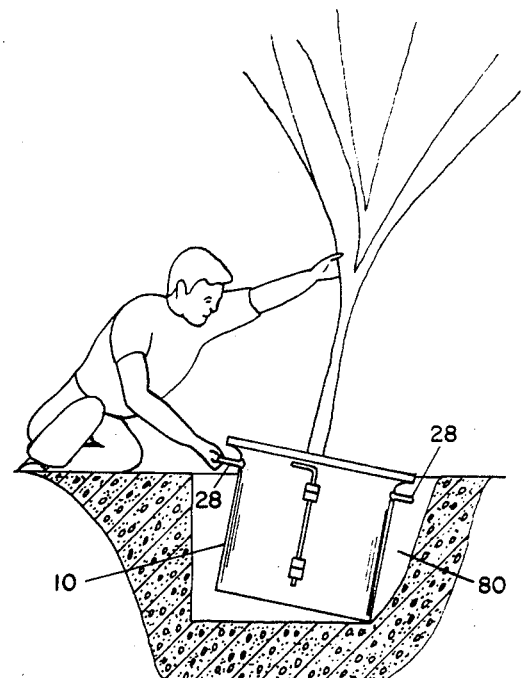
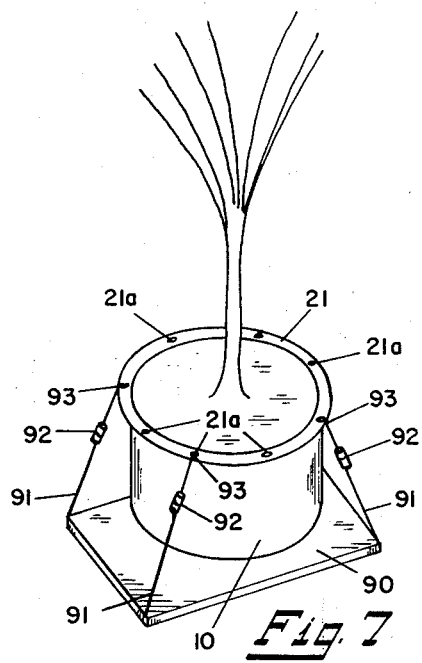
INVENTORS
ROBERT S. CHILDS
EARL L. LOYSTER
BY *Joseph G. Werner*
ATTORNEY

United States Patent Office 3,471,192
Patented Oct. 7, 1969

3,471,192
APPARATUS FOR TRANSPLANTING TREES
Robert S. Childs, 1818 St. Dunstan Drive, Madison, Wis. 53705, and Earl L. Loyster, Madison, Wis.; said Loyster assignor to said Childs
Filed Dec. 8, 1967, Ser. No. 689,141
Int. Cl. A01b *13/00;* A01g *23/06;* E02f *3/76*
U.S. Cl. 294—50.7                    2 Claims

ABSTRACT OF THE DISCLOSURE

Apparatus for removing trees comprising two semi-cylindrical shells connectable to form a substantially rigid cylinder capable of being driven into the ground about the roots of a tree. Handles are provided near the top of the cylinder for manipulating and carrying the apparatus during removal and transportation of a tree.

BACKGROUND OF THE INVENTION

Field of the invention

This invention relates to a method of and apparatus for removing and transplanting trees.

Description of the prior art

Many of the known devices for removing trees are structurally complex and require considerable expense of time and labor in set up and operation. A typical device in present use is disclosed in U.S. Patent No. 2,313,604. Other devices, such as those disclosed in U.S. Patents No. 1,597,281 and No. 2,863,258, although simpler in operation and more efficient, are of limited size and penetrating power and are unsuitable for use on any but seedling trees and small shrubs. In the absence of an efficient, easily operated device, nurserymen and landscapers have generally resorted to a simple shovel for removing and replanting young trees.

Hand digging, in addition to being quite inefficient, results in unnecessary disturbance of the root structure of the tree or shrub, particularly where the soil is loose or sandy. Much of the soil surrounding the root system is loosened during digging and drops off during removal thus exposing the roots to air. Such exposure results in drying, which can seriously injure or kill a tree. If the root system is to be wrapped in burlap as is frequently done, soil must be added to protect the roots.

Excessive cutting of the roots with a shovel during removal also may cause substantial damage.

The most desirable practice is to cut the roots off cleanly and to retain as much of the surrounding soil as possible. It is also desirable to remove a "ball" of roots and soil of fairly uniform size and shape if the tree is to be wrapped. This is difficult to accomplish where the tree is removed by shovel.

Replanting the tree presents somewhat similar problems in that there is no really practical, efficient manner of preparing the hole for the tree. Once more, resort is usually made to a hand shovel. Matching the size of the "ball," righting the tree, filling the excavation and disposing of excess soil present additional problems, particularly where a tree is being emplaced in an established lawn or garden.

SUMMARY OF THE INVENTION

Generally, our invention comprises a novel method of and device for transplanting young trees and shrubs with the roots and surrounding soil kept substantially intact. Our novel transplanting device consists basically of two semicylindrical shells, releasably connected to form a substantially rigid cylinder about the base of a tree or shrub. The bottom edge of the cylinder is sharpened to permit easy penetration of soil and cutting of roots. The top portion of the cylinder is flared to present a substantially horizontal, flat annular surface, adapted to be engaged by means for driving the assembled cylinder into the ground about the roots of a tree or shrub.

The cylinder is driven into the ground by placing a board, such as a 2 x 4, across the flared top portion, engaging the board with a driving rod and applying a series of concussive forces to the driving rod. The concussive forces may be applied to the driving rod with a fence post driver or a similar implement and are preferably applied as close to the tree trunk as practical so that the cylinder will be driven substantially straight down.

After the transplanter is driven into the ground to a suitable depth, indicated generally by the location of lifting handles, an excavation is made outside about one-half of the periphery of the transplanter and to its full depth. Tilting the transplanter into the excavation breaks off the soil and roots at the bottom, freeing it for easy removal.

The transplanter is provided with a separate attachable base portion for sealing the bottom if the tree is to be transported a considerable distance in the transplanter.

The resulting "ball" of soil and roots can be wrapped much more readily using the transplanter, since in each instance, the "ball" is of substantially uniform size and shape and is so preserved until wrapping is done.

Disturbance of the roots and surrounding soil is minimized with our transplanter and very little soil is lost.

The roots are cut cleanly by the sharpened bottom edge of the transplanter, resulting in a minimum of damage to the tree.

Our transplanter is very simple in construction and operation and requires no maintenance.

The transplanter can, of course, be used with equal effectiveness in making an excavation for receiving a transplanted tree. The uniform size and shape of the "ball" is especially significant here, making transplanting not only much easier, and faster, but also neater. The soil removed may be carried from the site and disposed of at any convenient location. Turf may also be easily preserved for replanting about the transplanted tree.

Further objects, features, and advantages of our invention will be apparent from the following detailed description taken in conjunction with the accompanying drawings which show a preferred exemplary embodiment of our invention.

BRIEF DESCRIPTION OF THE DRAWINGS

FIG. 5 is an elevation view of our transplanter being driven into the ground, showing its ultimate position in phantom.

FIG. 6 is an elevation view of our transplanter being tilted for removal from a hole shown in section.

FIG. 7 is a perspective view of our transplanter with base portion in place for transporting a tree.

DESCRIPTION OF THE PREFERRED EMBODIMENT

Figure 2:
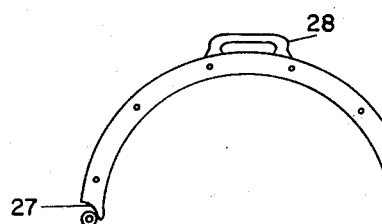
FIG. 2 is a top view of the semi-cylindrical shell of FIG. 1.
Figure 3:
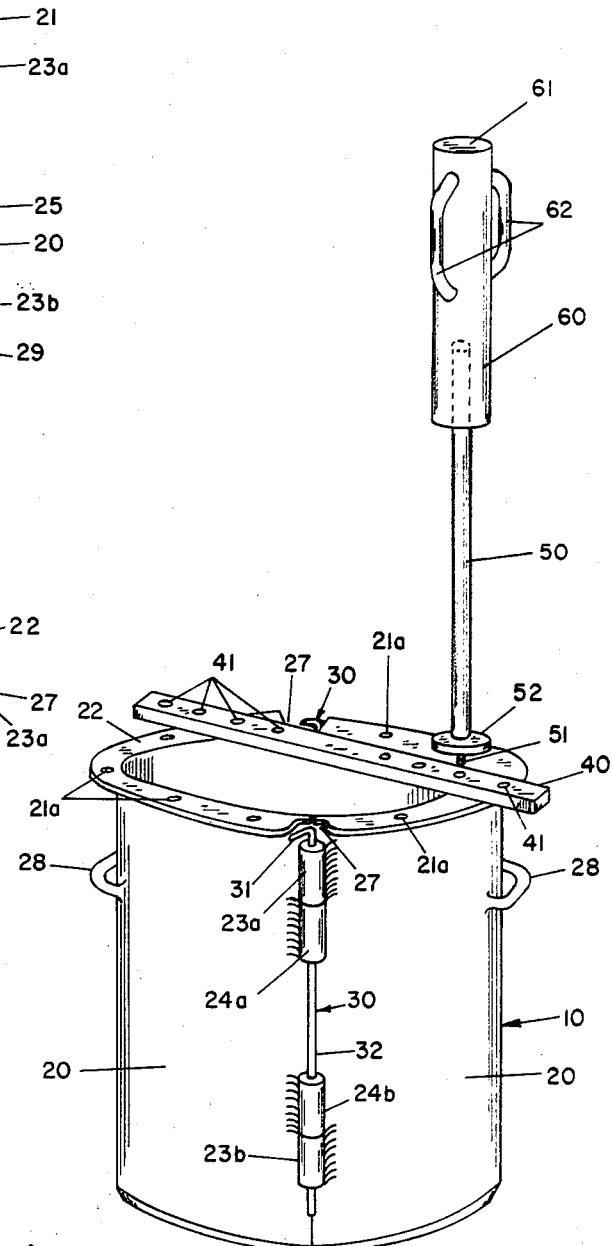
FIG. 3 is a perspective view of our transplanter assembled for use.

Our novel transplanter is best seen in assembled form in FIG. 3 where it is generally indicated at 10. It comprises basically two semi-cylindrical shells 20, best seen in FIGS. 1 and 2, locking bars 30, driving board 40 and driving rod 50. Suitable driving means in the form of a fence post driver 60 is shown in FIG. 3.

Figure 1:
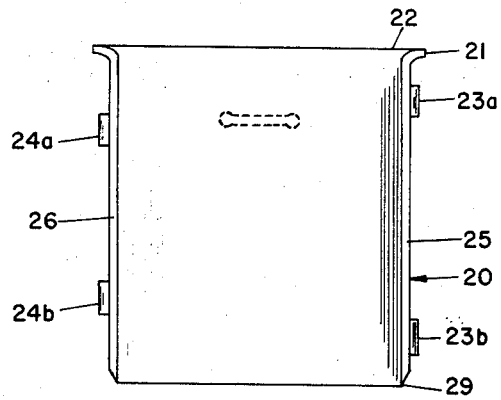
FIG. 1 is an elevation view of one of the two identical semi-cylindrical shells which connect to form our transplanter.

Referring now to FIGS. 1 and 2, the semi-cylindrical shells 20 of our transplanter 10 are substantially identical, permitting interchangeability and ease of manufacture. Each semi-cylindrical shell 20 is constructed of steel plate stock with a flared top portion 21 projecting outwardly along the periphery to form a substantially flat annular surface 22. A number of evenly spaced holes 21a are drilled through the flared top portion to accept hooks 75 of removable base portion 70, as best seen in FIG. 7. The bottom edge 29 of shell 20 is sharpened to permit easy penetration of soil and to cut interfering roots.

Two pairs of connecting tubes 23a, 23b and 24a, 24b are permanently affixed to shell 20 at connecting edges 25 and 26 by welding or other suitable means. Each pair 23a, 23b and 24a, 24b is placed in spaced relation and is axially aligned.

When two semi-cylindrical shells 20 are brought together for assembly, the inner pair of tubes 24a 24b of one shell collocates between the outer pair of tubes 23a, 23b of the other shell to form two axially aligned passages near the top and bottom of transplanter 10. Locking bar 30, may be passed through connecting tubes 23a, 24a and 23b, 24b to form a hingelike connection. The flared top portion 21 of shell 20 has cutouts 27 to permit locking rod 30 to be inserted into and removed from connecting tubes 23a, 24a, 23b and 24b at the top of transplanter 10.

Locking bar 30 is of circular bar stock having a diameter slightly smaller than the inner diameter of the connecting tubes 23a, 23b, 24a, 24b permitting free insertion and withdrawal. Locking bar 30 is bent to form a locking handle 31 and a straight connecting portion 32 at right angles to each other. Locking handle is rotated under flared top portion 21 of transplanter 10 to fix locking bar 20 in position.

Each shell 20 has a handle 28 affixed to its outer side near the top by welding or other suitable means. The handles 28 of the assembled transplanter 10 are located near the top for ease of handling.

The parts of our transplanter 10 are quite firmly connected when it is fully asembled. The collocation of the connecting tubes 23a, 24a and 23b, 24b prevents vertical displacement of the shells 20. Connecting portion 32 of locking rod 30 permits only minimal lateral movement of shells 20. The positioning of the locking handle 31 of locking bar 30 under the flared portion 21 prevents vertical movement of the locking bar 30.

A wooden board 40, preferably 2 x 4 or larger, long enough to traverse and rest on the flared portion 21 of the transplanter 10 is used for transmitting driving force. A series of holes 41 is drilled through the flat portion of the board near each end to accept the tip portion 51 of driving rod 50. The board 40 rests freely on flared portion 21 of the transplanter and can be moved about to facilitate driving of the shells from the most suitable position. While a wooden bar has been found suitable, other materials such as a rectangular steel bar may, of course, be used.

Driving rod 50 is preferably of heavy steel circular bar stock, preferably about 1 to 1½ inches in diameter and about 2½ to 3 feet long. A steel disc 52 is concentrically connected to the bottom end of the rod 50 to form a transverse bearing surface for engaging the surface of board 40. The tip 51 which is substantially smaller in diameter than driving rod 50 and is preferably about 1 to 2 inches long, making it adaptable to be inserted and loosely retained in the holes 41 of board 40, projects from the center of steel disc 52.

The driving rod 50 is well suited to be used with a typical fence post driver 60, constructed of a length of 3 or 4 inch diameter steel pipe, having an enclosed, weighted top end 61 and handles 62.

Figure 4:
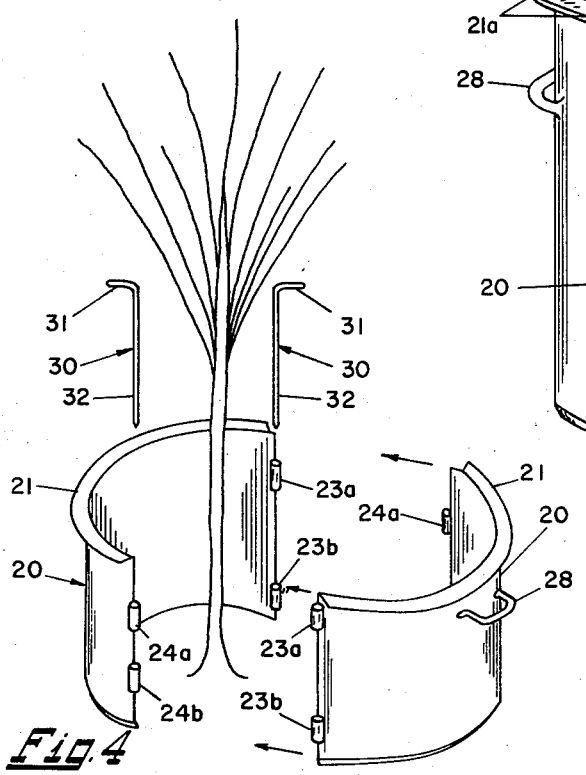
FIG. 4 is a perspective operational view, indicating the manner in which our transplanter is assembled about a tree.

In use our transplanter 10 is assembled about the trunk of a small tree as shown in FIG. 4. For convenience, one of the locking bars 30 may be left in place, permitting the two shells 20 to be hingedly opened and closed about a tree. The tree should be centered in the transplanter and any branches interfering with operation tied up before driving.

With the transplanter in place, the workman places board 40 across the top flanged portion 21 and inserts driving rod 50. The operator then imparts successive blows to the driving rod with fence post driver 60 as shown in FIG. 5. Driving continues until the handles 28 are about flush with the ground, as shown in phantom in FIG. 5.

The next step is to excavate the soil from slightly more than one-half of the periphery of the transplanter 10 and substantially to its full depth. A tapered hole of from 8 to 12 inches wide at the top usually sufficient. Preferably, the hole 80 is centered on one of the handles 28, so the workman can grasp the opposite handle to tilt the transplanter 10 into the tapered hole 80 as shown in FIG. 6. A sharp lift breaks the transplanter 10 free from the soil and roots at the bottom. The transplanter 10 and tree may then be lifted from the ground with the roots and surrounding soil intact.

Particularly dry or sandy soil may be soaked before removal is attempted to prevent excessive soil loss. While this may be done before or after the transplanter 10 is driven, it is much easier, of course, to drive the transplanter 10 into moist soil, making soaking generally advisable before driving If a tree is to be wrapped after removal, it may be placed on the wrapping material while the transplanter 10 is still in place. The transplanter 10 is then removed and the wrapping material drawn up around the "ball" and tied.

When the tree is to be carried or transported some distance for replanting without intermediate wrapping, we provide an attachable base portion 90 of plywood or the like. As shown in FIG. 7, base portion 90 is square and large enough to seal the bottom of transplanter 10. Cables 91, having turnbuckles 92 and hooks 93 are affixed at each corner. Hooks 93 are adapted to engage holes 21a in flared portion 21. Tightening turnbuckles 92 fixes base portion 90 in place.

The transplanter 10 is ideal for preparing a hole for a transplanted tree or shrub. The hole is of precisely the correct size and dimension for the "ball" of a tree which was removed using an identical transplanter. The soil removed is retained in the transplanter 10 and can be discarded at any convenient location. If the hole is made in an established lawn, the top layer of turf may be easily removed for replacement around the newly planted tree. Soil from the excavation made outside the transplanter for tilting may be placed on a tarpaulin or the like for replacement after the new tree is in place. The finished job is much neater and is quickly and easily accomplished.

It should be apparent that our transplanter can be made in various sizes to handle various sizes and types of trees or shrubs. Typical dimensions of transplanter 10 are about 18 inches in diameter and from about 18 to 24 inches in height.

It is understood that our invention is not confined to the particular construction and arrangement of parts herein illustrated and described, but embraces all such modified forms thereof as come within the scope of the following claims.

We claim:

1. A tree transplanting apparatus comprising:

(a) a pair of semi-cylindrical metal shells with substantially straight parallel sides,
(b) means for releasably connecting said semi-cylindrical shells to form a substantially rigid open-ended cylinder about a tree,
(c) said semi-cylindrical shells housing a bottom cutting edge,
(d) said semi-cylindrical shells each having a semi-circular outwardly flared top driving edge, and
(e) a substantially rigid elongate member transversing the top of said cylinder and resting on said flared top driving edge, said elongate member having at least one hole near each end thereof,
(f) a metal driving rod having a solid elongate portion, a transverse rigid disc affixed at one end thereof and a short tip portion projecting longitudinally from the center of said disc, said tip portion being adapted to engage the holes in said elongate member with said disc resting thereon, and
(g) means for imparting concussive force to said driving rod.

2. A tree transplanting apparatus comprising:
(a) a pair of semi-cylindrical metal shells with substantially straight parallel sides,
(b) said semi-cylindrical shells each having a substantially semi-circular outwardly flared top driving edge,
(c) at least one metal tube affixed at each of said parallel straight edges on each of said shells,
(d) a pair of removable locking bars having straight elongate portions inserted downward between said flanges into said metal connecting tubes for securing said shells together to form a substantially rigid open-ended cylinder, and
(e) said locking bars having a transverse locking handle portion at their top end abutting the underside of said flared top edge to prevent said locking bars from being vertically displaced from said connecting tubes during driving of said cylinder into the ground.

References Cited
UNITED STATES PATENTS

| | | | |
|---|---|---|---|
| 1,829,002 | 10/1931 | Gillogly | 37—2 |
| 2,035,980 | 3/1936 | Pope | 294—50.7 |
| 2,863,258 | 12/1958 | Gish | 37—2 |
| 2,989,335 | 6/1961 | North | 294—50.7 |
| 3,040,456 | 6/1962 | Pearce | 37—2 |
| 3,191,982 | 6/1965 | Goalard | 37—2 |
| 3,284,932 | 11/1966 | Wendlandt | 37—2 |

ROBERT E. PULFREY, Primary Examiner
EUGENE H. EICKHOLT, Assistant Examiner

U.S. Cl. X.R.
37—2; 47—37